US007623221B2

(12) United States Patent
Thun et al.

(10) Patent No.: US 7,623,221 B2
(45) Date of Patent: Nov. 24, 2009

(54) APPARATUS FOR AND METHOD OF DETERMINING DISTANCE

(75) Inventors: Andreas Thun, Berlin (DE); Wilfried Wagner, Berlin (DE)

(73) Assignee: IRIS GmbH, Berlin (DE)

(*) Notice: Subject to any disclaimer, the term of this patent is extended or adjusted under 35 U.S.C. 154(b) by 0 days.

(21) Appl. No.: 11/818,525

(22) Filed: Jun. 13, 2007

(65) Prior Publication Data

US 2008/0144000 A1 Jun. 19, 2008

(30) Foreign Application Priority Data

Jun. 14, 2006 (DE) ....................... 10 2006 029 025

(51) Int. Cl.
*G01C 3/08* (2006.01)

(52) U.S. Cl. ....................... 356/5.06; 356/5.01; 356/5.1

(58) Field of Classification Search ....... 356/3.01–3.15, 356/4.01–4.1, 5.01–5.15, 6–22, 128, 128.5, 356/139.09, 139.1

See application file for complete search history.

(56) References Cited

U.S. PATENT DOCUMENTS

2004/0233416 A1* 11/2004 Doemens et al. ........... 356/5.01
2005/0057741 A1* 3/2005 Anderson et al. .......... 356/5.01
2007/0097349 A1* 5/2007 Wada et al. ................ 356/4.06

FOREIGN PATENT DOCUMENTS

| | | |
|---|---|---|
| DE | 30 20 996 | 3/1985 |
| DE | 100 51 505 | 5/2002 |
| DE | 10153742 | 5/2003 |
| DE | 102 53 437 | 5/2004 |
| EP | 1 031 477 | 9/2004 |
| EP | 1 118 208 | 11/2004 |
| WO | WO 99/34235 | 7/1999 |

OTHER PUBLICATIONS

R. Miyagawa and T. Kanade, "*CCD-Based Range-Finding Sensor*," IEEE Transactions on Electron Devices, vol. 44, No. 10, Oct. 1997, pp. 1648-1652.

* cited by examiner

*Primary Examiner*—Thomas H Tarcza
*Assistant Examiner*—Luke D Ratcliffe
(74) *Attorney, Agent, or Firm*—Ware, Fressola, Van Der Sluys & Adolphson LLP

(57) ABSTRACT

Apparatus for determining distance comprising a transmitting unit for emitting a light pulse, a receiver matrix having at least one photoelectric element and a control unit, wherein the receiver matrix has a first and a second integrator which are connected to the photoelectric element, which are activatable independently of each other and which are each adapted to integrate a measurement signal outputted by photoelectric element over a period of time predetermined by the control unit and thereby to form an integrator state and to output the integrator state as an output signal.

40 Claims, 7 Drawing Sheets

APPARATUS FOR AND METHOD OF DETERMINING DISTANCE

CROSS REFERENCE TO RELATED APPLICATIONS

This application claims priority under 35 USC §119 to German Patent Application No. 10 2006 029 025.9-55 filed on Jun. 14, 2006.

BACKGROUND OF THE INVENTION

1. Technical Field

The invention concerns an apparatus for and a method of determining distance. Apparatuses for and methods of determining distance in the sense of the present invention are based on the principle of emitting a light pulse and measuring the transit time between the commencement of emission of the light pulse and the reception of the components of the light pulse, which are reflected by an object. The distance to a reflecting object is afforded in that case in the form of the product of half the measured transit time and the speed of light.

2. Discussion of Related Art

Apparatuses for determining distance which are known in the state of the art have a transmitting unit for emitting a light pulse, a receiver matrix having at least one photoelectric element and a control unit which is connected to and controls the transmitting unit and the receiver matrix. The transmitting unit is adapted to emit a light pulse when an activation signal is applied to a first control input, in which case the light of the light pulse can come from the visible spectrum or other spectral ranges of electromagnetic radiation. Thus for example invisible light in the infrared frequency range is suitable for use in an apparatus for determining distance.

The receiver matrix has a measurement output which supplies an output signal. The output signal is derived from a measurement signal which is generated by the at least one photoelectric element of the receiver matrix in dependence on light incident thereon. Advantageously the transmitting unit and the receiver matrix are so selected that the photoelectric element of the receiver matrix reacts particularly strongly to light of the wavelength of the light pulse emitted from the transmitting unit so that the output signal produced by the receiver matrix exhibits a particularly strong dependency on the intensity of received light of that wavelength.

WO 99/34235 discloses a method of and an apparatus for recording a three-dimensional distance image which function in accordance with the outlined basic principle of what is known as the time-of-flight methods. In that case a light pulse of a given duration in emitted and at the same time the procedure begins to integrate the photoelectric current of a photoelectric element over the given duration of emission of the light pulse. Integration of the photoelectric current is also concluded at the same time with the end of emission of the light pulse. As the photoelectric element outputs a substantially higher photoelectric current from the moment in time from which reflected components of the emitted light pulse reach the photoelectric element and that photoelectric current is integrated until the end of the emission of the light pulse, the integrator state at the end of the measurement period gives information as to the delay with which (that is to say after what transit time) the reflected light pulse reached the photoelectric element and thus gives information as to the magnitude of the distance to the reflecting object.

More specifically there is only ever a first portion of the received reflected component of the emitted light pulse that contributes to the integrator state as the integration time ends before the reflected light pulse has been completely incident on the photoelectric element. The first portion of the received reflected component of the emitted light pulse, which portion is detected by the photoelectric element and integrated, is in that case correspondingly greater, the shorter the distance between the object and the photoelectric element. Distance measurement based on the time-of-flight method is therefore substantially based on the fact that only a portion of the received reflected component of the emitted light pulse is integrated.

To improve the level of measurement accuracy, it is proposed in the above-specified source that measurement of the dark current and the ambient light (background) is additionally implemented, in which case no light pulse is emitted and the integration result thus reflects solely the component of the photoelectric current caused by the ambient light, over the measurement period. So that in addition the measurement result is also made independent of the reflection coefficient of the reflecting object, two measurements are implemented involving integration times of differing lengths and the respective measurement results are standardized by subtraction and quotient formation.

All known methods of determining distance by measurement of the transit time of a light pulse suffer from the disadvantage that the intensity of the reflected components of the emitted light pulse decreases in square relationship with the distance to the reflecting object. As a result the signal-noise ratio in respect of determining distance worsens with increasing distance to the reflecting object. A further disadvantage of the known distance measurement methods is that in principle only a part of the reflected light pulse is integrated for distance determination purposes, the magnitude of the integrated component being dependent on the transit time of the light pulse. That means that the signal-to-noise ratio additionally worsens for the measurement procedure because a smaller integrated useful signal is confronted with a constant noise signal.

DISCLOSURE OF INVENTION

The invention resolves the deficiencies of the state of the art by means of an apparatus which comprises

- a transmitting unit for emitting a light pulse of a predetermined pulse duration beginning with a leading rising edge and ending with a trailing falling edge, wherein the transmitting unit has a first control input and is adapted to emit a light pulse of the predetermined duration when a transmission start signal is applied to the first control input,
- a receiver matrix having at least one photoelectric element, wherein the receiver matrix has a measurement output for an output signal and is adapted to output an output signal which is derived from a measurement signal produced by the photoelectric element in dependence on light incident on the photoelectric element, and
- a control unit which is connected to the transmitting unit and the receiver matrix and adapted to produce the transmission start signal and output it to the transmitting unit and to receive the output signal from the receiver matrix and evaluate it, and which is distinguished in that it has two integrators which are either both connected to the same photoelectric element or to two separate photoelectric elements which are so arranged and adapted that both photoelectric elements detect the same reflected light pulse. In that arrangement the receiver matrix has a second control input for an integrator control signal by which the two integrators can be activated independently of each other. The integrators are each adapted to integrate the measurement signal produced by the respective photoelectric element in dependence on light incident thereon, over an integration time which is predetermined by the integrator control signal, and thereby to form an integrator state and output the integrator state as an output signal. The control unit is adapted to form a distance value on the basis of the emission of a light pulse and evaluation of the integrator states of the integrators, which are to be associated with the emitted light pulse.

To determine a distance value the control unit firstly triggers a light pulse of predetermined pulse duration and starts the first and the second integrators with a different time delay. The time configuration between the transmission start signal and the integrator control signal for starting the first integration time is also referred to hereinafter as the waiting period of time. Over their respective integration times the integrators integrate the measurement signal and thus form two integrator states which are possibly identical but which are generally different. The integrator states depend on the transit time of the reflected light pulse and the respective time delay for the start of the integrators and the respective integration time. The control unit forms the distance signal directly from the two integrator states—and thus in a different manner from the teaching known for example from DE 101 53 742.

The integrator control signal can be for example an integrator start signal or an integrator stop signal with which the respective integrator is started or stopped respectively. The respective integration time then elapses between the integrator start signal and the integrator stop signal for an integrator. The integrator control signal can also be an integrator switch-on signal, for the duration of which the respective integrator is switched on (activated) so that the duration of the respective integrator switch-on signal corresponds to the respective integration time.

The invention enjoys the advantage that two integrators which are actuable independently of each other are provided for detection of a reflected light pulse so that the integrators can be started in particular in time succession whereby in total a greater proportion of the reflected light pulse is incident in the cumulated integration time of both integrators. It is essential for measuring distance that each integrator has an integration time which at a maximum corresponds to the pulse duration of the light pulse so that, with one integrator, necessarily only a leading or a trailing portion of the reflected light pulse can be detected in order to acquire distance information. In a corresponding fashion, with one integrator, only a part of the energy of the reflected light pulse can be detected. Two integrators involving different integration times which both respectively involve at a maximum the pulse duration of the reflected light pulse (which spreads due to phase delays as a consequence of dispersion and can therefore be longer than the emitted light pulse) can in combination acquire the total energy of the reflected light pulse. With a short distance and a correspondingly short transit time in respect of the reflected light pulse the integrator which is started first acquires a greater part of the energy while, with a longer transit time in respect of the light pulse, the integrator which started later and which concludes integration later acquires a greater part of the energy of the reflected light pulse. That enhances the accuracy of distance measurement in a double sense: measurement errors are averaged out and the potentially very small number of photons detected is put to optimum use.

Preferably the integration times of both integrators are of the same length and in a particularly preferred variant correspond to the pulse duration of the emitted light pulse. Equally, it is preferable if the integration time of the second integrator is started at the moment in time at which the integration time of the first integrator ends. In a preferred variant the integration time of the first integrator begins at the same time as the emission of the light pulse and the pulse duration of the light pulse corresponds to the transit time of the light pulse to the furthest object to be acquired. In that case the waiting time duration is equal to zero.

Besides the preferred variant, in accordance with which the two integration times are in immediately adjoining relationship, it is also possible for the integration times of the two integrators to overlap or for there to be a gap between the two integration times. As long as the period of the overlap or the duration of the gap is known, distance measurement is possible in accordance with the invention in both cases.

An integrator has at least two operating states which can be selected by the integrator control signal. In the first operating state the integrator integrates the input signal at its output in relation to time (the integration time) while in the other operating state it stores the integrator state formed by integration of the input signal. At the same time the integrator state of the integrator can be reset or outputted by a corresponding integrator control signal.

The integrators can be for example capacitors which are connected to the photoelectric element for the duration of the respective integration time. Outside the respective integration time, the charge of the respective capacitor can be transferred to an accumulator which is associated with a respective capacitor and in which the charges of the respective capacitor are totaled over a plurality of measurement cycles in order in that preferred fashion to permit a higher level of measurement accuracy by distance measurement over a plurality of measurement cycles. The accumulator can also be a capacitor which can have a greater capacitance than the respective capacitor serving as an integrator. In order to implement two integrators, two accumulators are required, which accordingly also each act as an integrator in the sense of the invention. It is even possible for two accumulators to be connected by way of a single capacitor to a photoelectric element if the integration times do not overlap so that the single capacitor, after the end of the first integration time, transfers its charge to the first accumulator and then, after the end of the second integration time, it transfers its charge to the second accumulator.

Insofar as the invention provides two integrators ongoing integration of the measurement signal outputted by the photoelectric element is possible by one of the two integrators while the other integrator is just in the storage operating state. That provides that the apparatus according to the invention is also a basis for novel and advantageous distance determining methods which form the second aspect of the invention.

Advantageous variants of the apparatus according to the invention are subject-matter of the appendant claims and are set forth hereinafter.

In a variant of the invention the photoelectric element is rectangular, in particular square, and is of a side length of between 100 μm and 300 μm, in particular 200 μm. A photoelectric element of such a large side length, by virtue of the large area involved, has a particularly high level of sensitivity in relation to incident light and thus generates a particularly great photoelectric current which provides for determining distance with an improved signal-to-noise ratio and thus a reduced measurement error.

In a particularly preferred feature the receiver matrix has a plurality of photoelectric elements and a first and a second integrator for each photoelectric element, wherein the photoelectric elements are arranged in a two-dimensional array. All variants having such a receiver matrix with a plurality of photoelectric elements enjoy the advantage that not just an individual distance value but a two-dimensional array of distance values which represents a three-dimensional image of one or more reflecting objects is produced. In order to simplify actuation of the individual photoelectric elements it is preferred in that respect for the integrator control signal applied to the second control input to be applied simultaneously to all first or second integrators so that the individual integrators do not need to be individually selected for control of the operating states of integration and storage, but are actuated in two preferably mutually independent groups. In connection with this variant it is particularly advantageous if the photoelectric elements are respectively connected to a capacitor of relatively low capacitance, which is connected to a first and a second capacitor of greater capacitance as an accumulator and respective first and second integrators by suitable integrator control signals alternately after the end of a respective first and second integration time in order to transfer the respective charge collected during a first integration time to the first accumulator and to transfer the charge collected during a second integration time to the second accumulator.

The apparatus according to the invention can have an optical means which is arranged in front of the receiver matrix and is adapted to project light of the kind emitted by the transmitting unit onto the receiver matrix. Such an optical means affords for example the advantage that light reflected by an object can be collected and projected in a focused condition in the form of a image which is as sharp as possible onto a receiver matrix which is smaller in comparison with the diameter of the optical means so that the intensity of the light incident on an individual photoelectric element is increased.

In accordance with a preferred variant of the apparatus according to the invention the transmitting unit is adapted to emit infrared light. Infrared light affords the advantage that it is invisible to a human being so that this variant can be used without disturbing human beings because of the emitted light pulses and can be handled without any problem by conventional optical systems and receiver matrices.

Preferably the transmitting unit is adapted to deliver light pulses of differing intensity, wherein the intensity can be predetermined by the transmission start signal applied at the first control input. This variant of the invention makes it possible to carry out an operation of determining distance, which is adapted to the respective conditions involved, so that for example light pulses of greater intensity can be used in an environment involving a comparatively large amount of background light, than in environments involving little or no background light.

In all embodiments of the distance determining apparatus the control unit can have a timer which is adapted to display to the control unit the elapse of a period of time predetermined by the control unit. The provision of a timer makes it possible to also carry out more complex measurement procedures for determining distance.

In a particularly preferred embodiment with a timer the control unit is adapted to carry out a measurement cycle with an integration time predetermined by a first activity period of time and in that case by virtue of delivery of respective integrator control signals firstly to activate the first integrator and after a first elapse of the first activity period of time to deactivate the first integrator and activate the second integrator. Sequential activation of the first and second integrators forms the basis of a large number of alternative configurations of the apparatus according to the invention which make it possible to implement error-reduced measurements for determining distance.

In relation to the last-mentioned variant the control unit is preferably adapted during the execution of a measurement cycle to deactivate the second integrator after a second elapse of the first activity period of time, which is measured from the moment of the first elapse of the first activity period of time. Therefore the two integration times immediately follow each other, they are of the same length and they correspond in respect of their duration to the first activity period of time. The pulse duration of the light pulse can also correspond to the duration of the first activity period of time and thus the two integration times. The first activity period of time which is predetermined by the timer can thus determine both the pulse duration of the light pulse and also the two integration times in respect of the duration thereof.

In a variant which is also preferred independently thereof the control unit can be adapted to activate the transmitting unit for the duration of the first elapse of the first activity period of time, that is to say the light pulse is triggered during the total integration time of the integrator started first.

In that sense it is advantageous if the control unit is adapted during the execution of a measurement cycle to simultaneously activate the transmitting unit and the first integrator by delivery of a transmission start signal and an integrator start signal. Insofar therefore as the transmitting unit is not activated earlier than the first integrator but the beginning of emission of the light pulse coincides with the beginning of the first integration time, the system ensures when executing a measurement cycle that, upon activation of the first integrator, the light pulse emitted by the transmitting unit has not already covered a distance and a first part of the reflected light pulse is possibly not acquired by the first integrator. It is then not possible to see from the resulting integrator state of the first integrator whether it is a leading part of the light pulse or a trailing part of the light pulse, which was not detected by the first integrator. That makes it impossible to determine a distance to an object which is at a shorter distance than that covered distance.

Particularly preferably the control unit is adapted to execute a plurality of measurement cycles wherein the first integrator and the second integrator are adapted to store their respective integrator state between the measurement cycles and thus to integrate the measurement signal over a plurality of measurement cycles, and the control unit is adapted to receive the respective output signal outputted by the first integrator and the second integrator after execution of the plurality of measurement cycles and to evaluate same. During a respective measurement cycle integration is effected in respect of the measurement signal produced in dependence on light incident on the respective photoelectric element and the integration states at the end of the respective integration time are accumulated over a plurality of measurement cycles, that is to say totaled. As the maximum intensity of the emitted light pulse is limited for various reasons, that embodiment of the invention allows the accumulation of the respective integrator states over a plurality of measurement cycles, whereby as a result the operation of determining distance can be carried out, with a reduced measurement error.

Preferably the first activity period of time is between 10 and 100 ns, in particular 20 ns. A first activity period of time of that magnitude is suitable for measurements as far as a distance of some meters. A value of 20 ns is suitable for distance measurement of up to 3 m.

In a variant of the apparatus according to the invention the control unit can have an A/D converter which is adapted to convert an output signal received from the receiver matrix into a digital representation and to output it as a result value. Conversion of the output signal into a digital representation affords the advantage that subsequent evaluation of the output signal can be effected digitally and thus in a loss-free manner apart from the quantization errors in A/D conversion.

In that case there can be provided a respective A/D converter for each photoelectric element, by which the measurement signal is immediately converted into a digital signal so that integration and accumulation can be effected without capacitors by a digital procedure. In the case of integrators formed by capacitors there is associated with a respective capacitor forming an integrator its own A/D converter so that two A/D converters are associated with each photoelectric element.

A development of this variant of the invention therefore has a control unit having an arithmetic logic unit which is connected to the A/D converter and adapted to interlink a first, preferably accumulated result value converted by the A/D converter and outputted by the first integrator or an associated accumulator, and a second, preferably accumulated result value converted by the A/D converter and outputted by the second integrator or associated accumulator, in accordance with a predetermined calculation rule, and to output the calculation result. In that respect the calculation rule is particularly preferably $$s = \frac{cT}{4}\left(1 + \frac{A_2 - A_1}{A_1 + A_2}\right) \text{ with } A_1 = \sum_{n=1}^{200} pE_1 \text{ and } A_2 = \sum_{n=1}^{200} pE_2,$$

wherein s is the calculation result, c is the speed of light, T is the first activity period of time (for a distance measurement up to 3 m with a signal path up to 6 m, for example 20 ns, corresponding to the transit time of the light pulse over the signal path of 6 m), $A_1$ is the first result value is converted by the A/D converter and which in the case by way of example is accumulated over 200 measurement cycles, and $A_2$ is the second result value converted by the A/D converter and in the case by way of example also accumulated over 200 measurement cycles. That calculation rule links the result values of two distance determining procedures in such a way that an error-reduced calculation and thus measurement result is afforded. In addition the total detected light energy is involved as the total of the two result values, $A_1+A_2$, in the distance measurement procedure.

The control unit can be adapted after the execution of a first measurement cycle with a first activity period of time to execute a second measurement cycle with a second activity period of time, the second activity period of time being shorter than the first activity period of time.

In that respect in addition the control unit can be adapted when executing the second measurement cycle to allow a waiting period of time to elapse after the delivery of the transmission start signal and to deliver the integrator control signal for starting the first integrator after the elapse of the waiting period of time. As the measurement error increases with greater distances, the execution of a second measurement cycle with a waiting period of time makes it possible to provide a specific measurement for greater distances, in which case the waiting period of time prevents interference influences already falsifying the output signal of the first integrator during the waiting period of time, before components of the light pulse reflected by a remote object were able to return to the receiver matrix.

In a particularly preferred feature the transmitting unit is adapted to emit light pulses of differing pulse duration, wherein the pulse duration can be predetermined by the control unit by the transmission start signal, and the control unit is adapted to execute the first measurement cycle with a light pulse of a first pulse duration and a first intensity and the second measurement cycle with a light pulse of a second pulse duration and a second intensity, wherein the first pulse duration is greater than the second pulse duration and the first intensity is less than the second intensity. This embodiment has the advantage that a higher level of intensity of the light pulse can be provided for the second measurement cycle with similar energy consumption by virtue of the shorter pulse duration, in which case the higher level of intensity permits an additionally improved measurement result in respect of determining distance for objects which are far away.

In an advantageous embodiment of the apparatus according to the invention the control unit is adapted to determine a distance of a region-of-interest in relation to the receiver matrix on the basis of the output signal of the receiver matrix of the first measurement cycle and to make the waiting period of time less than or equal to the transit time of light over a path corresponding to double the distance. That affords the advantage that the second, error-reduced measurement can be matched to precisely the distance range in which an object of interest was located, by the first measurement cycle. In that respect the region-of-interest can be determined for example by a histogram of the distance values determined for the individual photoelectric elements of the receiver matrix being produced and by the distance in relation to the region-of-interest being derived from that histogram. That operation of deriving the distance can relate to the distance value which is most frequently encountered, the center of the histogram or the lowest distance value which is found, in which respect known statistical evaluation procedures can be employed.

Advantageously the integration time selected for this variant corresponds to an activity period of time which is afforded by the transit time of the light pulse to an object in the center of the distance region which is of interest, less the waiting period of time.

Preferably in that case the pulse duration of the light pulse is equal to the second activity period of time so that the pulse duration of the light pulse emitted during execution of the second measurement cycle is just as long as the period of time during which the first integrator integrates the measurement signal.

All embodiments of the apparatus according to the invention can have an image sensor which is adapted to detect an image region projected onto the image sensor in a two-dimensional image, in particular a two-dimensional color image, and is so arranged that the image region detected by the image sensor and an image region detected by the receiver matrix overlap at least in a partial region, wherein the control unit is adapted to link the two-dimensional image and the evaluated output signal in the partial region to afford a three-dimensional image so that the three-dimensional image has a distance value at each pixel.

In a particularly preferred feature in that case the image sensor has a higher resolution than the receiver matrix which includes the photoelectric elements used for distance measurement. By virtue of the lower demands in terms of sensitivity in relation to light the dimensions of a pixel of the image sensor can be greatly reduced in comparison with those of a photoelectric element of the receiver matrix so that a plurality of pixels of the image sensor can be associated with each photoelectric element of the receiver matrix.

A second aspect of the invention concerns an improved method of determining distance comprising the steps:

emitting a light pulse of a predeterminable pulse duration, integrating a photoelectric current of a photoelectric element during a first elapse of a first activity period of time, optionally: accumulating first integrator states obtained in that way over a plurality of measurement cycles, outputting a first output signal, integrating the photoelectric current of the photoelectric element during a second elapse of the first activity period of time which directly adjoins the first elapse of the first activity period of time, optionally: accumulating second integrator states obtained in that way over the plurality of measurement cycles, outputting a second output signal, and determining a signal transit time of the light pulse by evaluation of the first and second output signals.

The method according to the invention provides for improved determination of distance as the photoelectric current of the photoelectric element is integrated before and after a moment in time characterized by the elapse of the first activity period of time and the beginning of the second elapse of the first activity period of time, to afford its own respective output signal, wherein the first and second output signals contain information about the relative position in respect of time of the switching-over moment in time in relation to the reflected components of the light pulse which are received after a corresponding transit time, on the basis of which error-reduced determination of a signal transit time in respect of the light pulse and thus a distance in relation to a reflecting object is effected.

A preferred variant of the method according to the invention is one in which the first activity period of time is equal to the predeterminable pulse duration of the light pulse. That variant of the method on the one hand saves energy because the emitted light pulse is no longer than the first activity period of time during which the photoelectric current is integrated while on the other hand it does not worsen the result of the distance determining procedure by virtue of the fact that the distance determining procedure does not involve photoelectric currents of the photoelectric element, which falsify the result of the distance determining procedure, beyond the pulse duration of the emitted pulse.

Advantageously, in a variant of the method, the intensity of the light pulse in the step of emitting the light pulse can be predetermined. By virtue thereof implementation of the distance determining procedure can be adapted to the ambient light which is respectively present in a measurement environment, insofar as for example a light pulse of greater intensity is used in an environment with more ambient light.

In order to reduce the measurement error in determining distance, a variant of the method provides that the steps of emitting the light pulse, integrating the photoelectric current during the first elapse of the first activity period of time and integration of the photoelectric current during the second elapse of the first activity period of time are effected a plurality of times prior to the steps of outputting the first output signal and outputting the second output signal, wherein the measurement error is reduced by averaging, for example by forming an arithmetic mean.

In order also to be able to determine short distances, a preferred variant of the method according to the invention provides that the steps of emitting the light pulse and integrating the photoelectric current are effected simultaneously during the first elapse of the first activity period of time.

Alternatively in a variant of the method a waiting period of time is allowed to elapse between the beginning of the step of emitting the light pulse and the beginning of the step of integrating the photoelectric current during the first elapse of the first activity period of time. This alternative configuration of the method is suitable for determining the distance in relation to objects which are further away, in which case an error-reduced measurement result is afforded insofar as the photoelectric current of the photoelectric element is not integrated during the waiting period of time during which no reflected components of the emitted light pulse can yet return to the photoelectric element and thus it cannot influence the measurement result in terms of determining distance.

A particularly preferred variant of the method according to the invention is one in which two measurement cycles are executed, wherein in the first measurement cycle the steps of emitting the light pulse and integrating the photoelectric current are effected simultaneously during the first elapse of the first activity period of time and in the second measurement cycle the waiting period of time is allowed to elapse between the beginning of the step of emitting the light pulse and the beginning of the integration step. In that variant a measurement result for reflecting objects at a short distance relative to the location of determining distance is determined by the first measurement cycle and a measurement result for reflecting objects at a greater distance is determined by the second measurement cycle, wherein the measurement result for the objects involving a greater distance has a reduced measurement error by virtue of the provision of the waiting period of time.

In a development of that variant of the method the waiting period of time is determined by evaluation of the output signal of the first measurement cycle in respect of a distance in relation to a region-of-interest, wherein the waiting period of time is less than or equal to the transit time of light over a path corresponding to double the distance to the region-of-interest. This variant of the method provides that evaluation of the output signal of the first measurement cycle determines a distance to which the waiting period of time of the second measurement cycle is matched in order to determine an error-reduced measurement result in respect of determining distance specifically for distances in the region of the distance in relation to the region-of-interest.

As the quality of determining distance decreases with increasing distances by virtue of the intensity, which decreases quadratically, of the reflected components of the emitted light pulse, a preferred variant of the method provides that in the first measurement cycle in the step of emitting the light pulse a light pulse of a first pulse duration and a first intensity is emitted and in the second measurement cycle in the step of emitting the light pulse a light pulse of a second pulse duration and a second intensity is emitted, wherein the first pulse duration is greater than the second pulse duration and the first intensity is lower than the second intensity. The greater second intensity causes a correspondingly increased intensity in respect of the reflected components of the emitted light pulse so that the distance determining procedure which is performed in the second measurement cycle, for great distances, is improved in respect of the measurement result.

In all variants of the method the first outputted output signal and the second outputted output signal are interlinked in accordance with a predetermined calculation rule, wherein the result of the predetermined calculation rule identifies a distance. Particularly preferably that calculation rule is $$s = \frac{cT}{4}\left(1 + \frac{A_2 - A_1}{A_1 + A_2}\right),$$

wherein s is the calculation result, c is the speed of light, T is the first activity period of time, $A_1$ is the first result value converted by the A/D converter and $A_2$ is the second result value converted by the A/D converter.

The method according to the invention can include a step of recording a two-dimensional image, in particular a color image, and a step of linking the two-dimensional image and the evaluated output signals to afford a three-dimensional image, wherein the three-dimensional image has a distance value in relation to each pixel.

BRIEF DESCRIPTION OF THE DRAWINGS

The invention is described in greater detail hereinafter with reference to drawings showing embodiments by way of example, in which.

DETAILED DESCRIPTION

Figure 1:
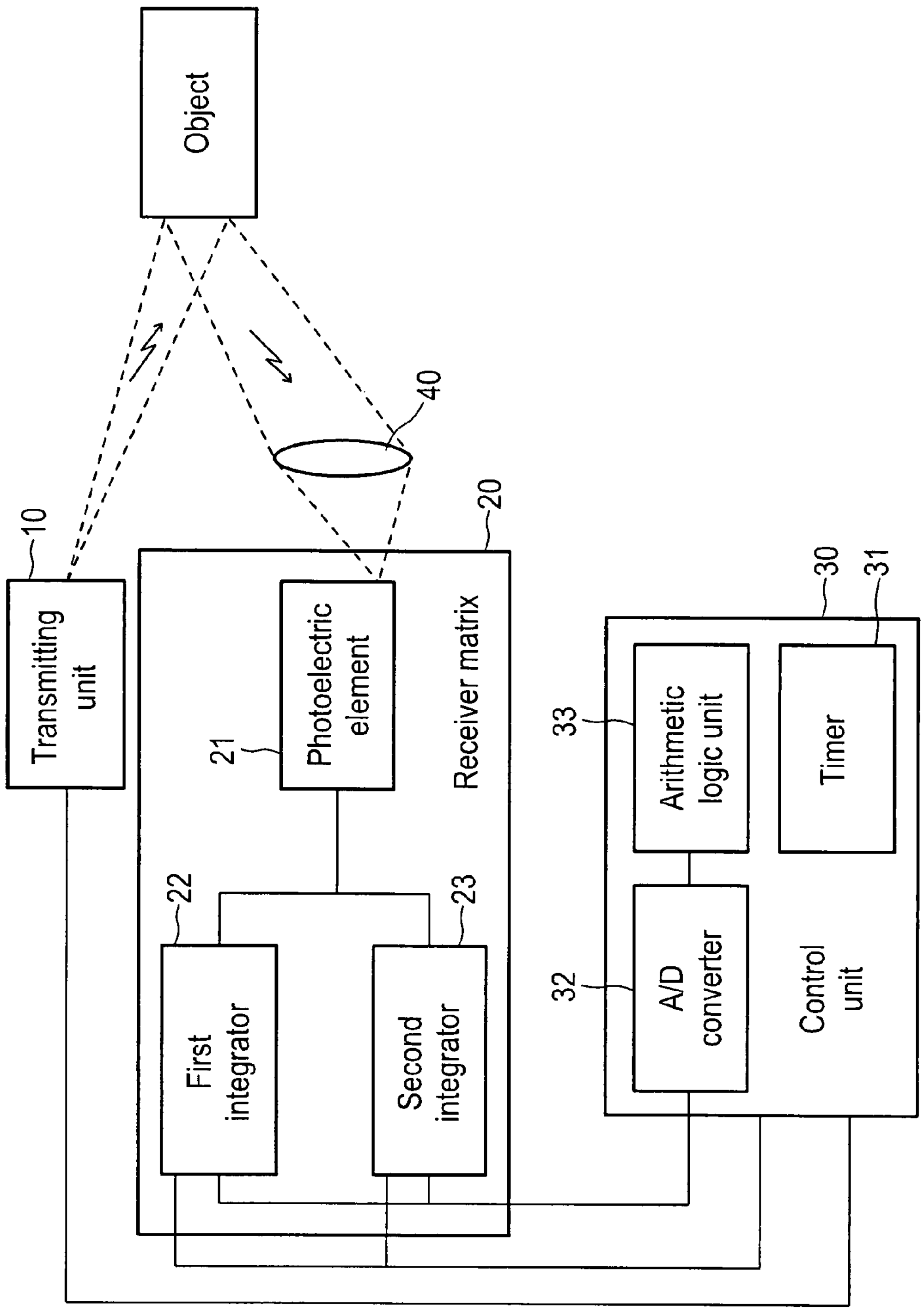
FIG. 1 shows a view of an embodiment of the apparatus according to the invention in the form of a block diagram.

FIG. 1 shows a view of an embodiment of the apparatus according to the invention in the form of a block diagram. The distance determining apparatus is divided into three main components, a transmitting unit 10, a receiver matrix 20 and a control unit 30, which are connected together by signal lines. The transmitting unit 10 is adapted to emit a light pulse at the instigation of the control unit 30, the pulse duration and the intensity of the emitted light pulse being predetermined by the control unit 30. The components of the emitted light pulse, which are reflected by an object, go to an optical means 40 which projects the incident reflected components onto a photoelectric element 21 or a two-dimensional array of photoelectric elements 21. The photoelectric element 21 forms part of the receiver matrix 20 which, for each photoelectric element 21, has a first integrator 22 and a second integrator 23, the integrator inputs of which are connected to the output of the photoelectric element 21. In dependence on the intensity of the light incident on the photoelectric element 21, it produces a photoelectric current which goes to the integrator inputs of the first integrator 22 and the second integrator 23.

The first integrator 22 and the second integrator 23 each have a respective control input, wherein, in an embodiment of the distance determining apparatus, all control inputs of the first integrators 22 and the second integrators 23 respectively are connected together so that the first integrators 22 can be activated independently of the second integrators 23 but none of the first integrators 22 can be activated independently of the remaining first integrators 22. The control inputs of the first integrators 22 and second integrators 23 are connected to the control unit 30 which adapted to control the first integrators 22 and the second integrators 23. Each first integrator 22 and each second integrator 23 also has an output for an output signal which can be individually read out by the control unit 30. The integrators 22 and 23 are adapted, upon activation by the control unit 30, to integrate a photoelectric current at the integrator input and thereby to form a integrator state. At the instigation of the control unit 30 the integrators 22 and 23 output the integrator state formed by integration, as an output signal.

The control unit 30 has an A/D converter 32 connected to the output of the integrators 22 and 23 and adapted to convert the output signal outputted by the integrators 22 and 23 into a digital representation. The A/D converter 32 is connected to an arithmetic logic unit 33 which is adapted to evaluate the output signals coming from the integrators 22 and 23 and converted into a digital representation.

The arithmetic logic unit links the digitized output signals 33 in accordance with a predetermined calculation rule and, for the output signals of the integrators 22 and 23 associated with each photoelectric element 21, calculates a result value specifying a distance which describes the length which is between the respective photoelectric element 21 and a point of the reflecting object, which is associated with the respective photoelectric element 21 by virtue of the beam path of the optical means 40.

The control unit 30 also has a timer 31 which is adapted to display to the control unit 30 the elapse of a period of time which is predetermined by the control unit 30. The timer makes it possible to carry out complex methods of determining distance, which provide a reduced measurement error as the result.

Figure 2:
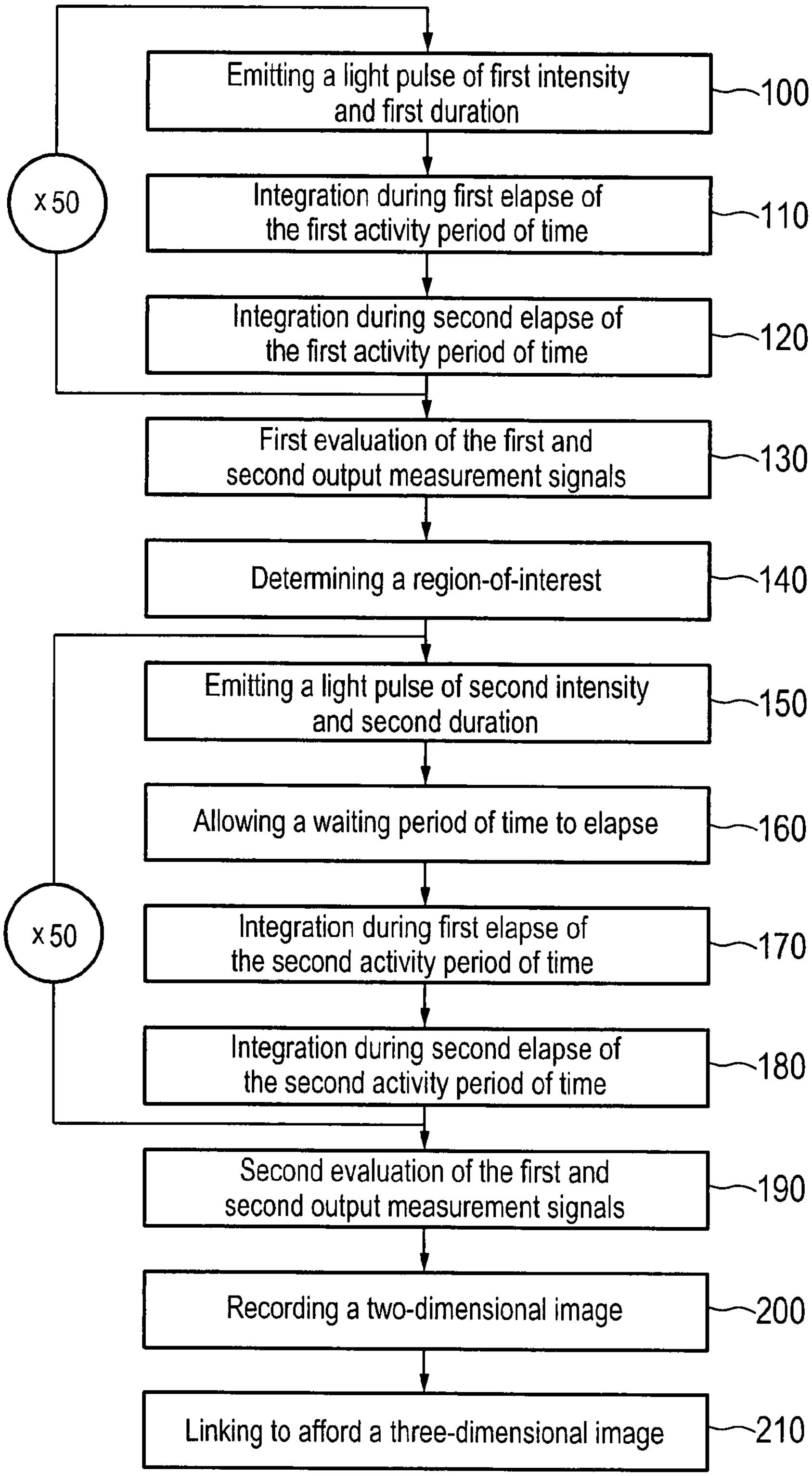
FIG. 2 shows a view of a variant of the method according to the invention in the form of a flow chart.

FIG. 2 shows a variant of the method according to the invention in a flow chart which begins at step 100 with the emission of a light pulse of a first intensity and a first pulse duration. Simultaneously with the beginning of emission of the light pulse, step 110 involves commencing integrating the photoelectric current of a photoelectric element during a first elapse of a first activity period of time. After the first elapse of the first activity period of time, in directly subsequent relationship, the photoelectric current of the photoelectric element is integrated over a second elapse of the first activity period of time (step 120). In order to reduce the measurement error in determining distance, after step 120 the flow chart branches back to step 100 after a waiting period of time has been allowed to elapse, which ensures that no components of the emitted light pulse, which are reflected from an object that is far away, are received during renewed integration of the photoelectric current, during the first elapse of the first activity period of time. In the illustrated example steps 100 through 120 are repeated 50 times, in which respect the number of repetitions upwardly is governed by the factors in respect of determining distance such as for example the maximum time available for measurement or by determining the distance in relation to a movable object.

After the 50 iterations the method continues with step 130 which involves effecting a first evaluation of a first and a second output signal. The first and the second output signals represent the integrator state which is respectively formed in steps 110 and 120 and which is reset after having been read out. Step 140 involves determining in the course of the evaluation operation a region-of-interest in which there appears to be an object in respect of which measurement results which are improved, by a second measurement operation, are to be determined. Step 150 again involves the emission of a light pulse, in which case that pulse is now of a second intensity and a second pulse duration and the second intensity is greater than the first intensity and the second pulse duration is less than the first pulse duration. While the pulse duration of the light pulse emitted in step 100 is equal to the first activity period of time the second pulse duration is shortened in relation to the first activity period of time by the duration of a waiting period of time which is calculated as double the transit time of light over the distance to the region-of-interest. After step 150 that waiting period of time is allowed to elapse in step 160 before, in step 170, the procedure begins with integration of the photoelectric current of the photoelectric element during a first elapse of the second activity period of time. In that respect the second activity period of time corresponds to the duration of the first activity period of time minus the waiting period of time. After the first elapse of the second activity period of time a second step of integrating the photoelectric current is carried out in step 180 during a renewed elapse of the second activity period of time. The method then branches back to step 150 for another 50 iterations in order to improve the measurement result in terms of determining distance by averaging, for example by forming the arithmetic mean, of a plurality of distance determining operations, as has already been done previously.

After the 50 iterations have been performed step 190 involves performing a second evaluation of the first and second output signals, in which case the measurement results are improved by virtue of the higher second intensity and the provision of the waiting period of time, in comparison with the result values determined in step 130. In subsequent step 200, a two-dimensional color image is recorded, which is linked with the determined distance values to afford a three-dimensional image in concluding step 210.

Figure 3:
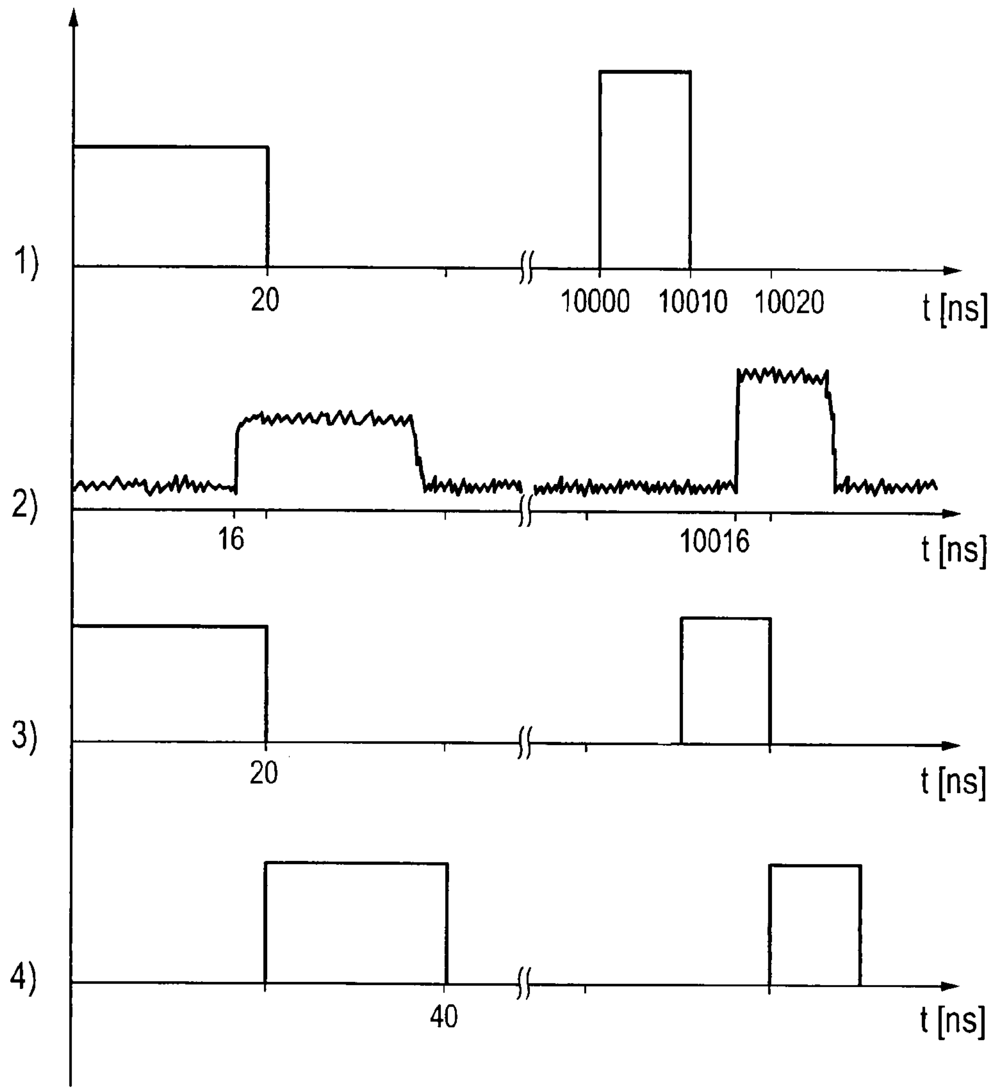
FIG. 3 shows an overview of the procedure in respect of time of a variant of the method according to the invention.

FIG. 3 shows an overview of the configuration in respect of time of a variant of the method according to the invention. The illustrated coordinate system, in four sub-coordinate systems 1) through 4), shows four different signals which are respectively plotted in relation to the time t specified in nanoseconds ns. The sub-coordinate system 1) plots the transmission start signal, upon the application of which the transmitting unit emits a light pulse. In the present case the pulse duration of the light pulse to be emitted is predetermined by the duration of application of the transmission start signal and the intensity of the light pulse to be emitted is predetermined by the amplitude of the transmission start signal. In the variant of the method according to the invention as shown in FIG. 3 therefore at the moment in time zero the procedure begins with the emission of a light pulse of 20 ns pulse duration and medium intensity.

Sub-diagram 2) shows the photoelectric current outputted by the photoelectric element, in which case the photoelectric current is at any time greater than zero and not constant due to noise and background light. Approximately after 16 ns the light pulse reflected by an object reaches the photoelectric element so that an increased photoelectric current can be detected for the period between 16 and 36 ns, which is correspondingly shown in sub-diagram 2). Simultaneously with the emission of the first light pulse, at the moment in time zero, under the control of the integrator control signal shown in sub-diagram 3), the first integrator is caused to integrate the photoelectric current to afford an integrator state. After elapse of activation of the first integrator, lasting 20 ns, the latter is deactivated and the second integrator is activated for a further 20 ns.

It should be pointed out once again here that the integration times (activity phases) of the two integrators can also overlap or that there can be a gap between the two activity phases. As long as the period of the overlap or the duration of the gap is known, distance measurement in accordance with the invention is possible in both situations.

It will become clear from a comparison of the relative position of the photoelectric current which is shown in sub-diagram 2) and which is increased by virtue of the reflected light pulse, with the activation phases of the first and second integrators, that the difference in the first and second integrator states contains information about the transit time delay in respect of the light pulse. If the difference in the integrator states of the first and second integrators is found to be zero, an equal-sized proportion of the photoelectric current which has been increased by the reflected light pulse must have passed to the photoelectric element within the activation phase of the first and second integrators respectively. That signifies that the reflecting object is disposed at such a distance in relation to the apparatus used for determining distance that the transit time of light to that object and from that object back to the apparatus is 10 ns. The distance to the reflecting object is thus afforded by multiplication of the measured 10 ns by half the speed of light in the example of a transit time of 10 ns, to afford approximately 1.5 m.

In the example shown in FIG. 3 the transit time was approximately 16 ns, and for that reason the integrator state of the second integrator is approximately of a value four times higher than the integrator state of the first integrator, which leads to a determined distance of about 2.5 m, having regard to a calculation rule provided for evaluation purposes.

After the first performance of the distance determining procedure, a waiting period of time of for example 160 ns is implemented, which ensures that no components of the emitted light pulse, which are reflected by an object that is far away, falsify subsequent measurements. In the illustrated embodiment, the distance determining operation is then repeated 50 times, which is not shown in sub-diagrams 1) through 4). Repetition of the distance measuring operation and summing or accumulating the integrator states over for example 50 measurement cycles is also frequently required for the reason that in an extreme case during an integration time of one measurement cycle no single photon of the reflected light pulse is detected by the respective photoelectric element as the energy of the reflected light pulse is so weak that theoretically only a fraction of a photon is to be expected per measurement cycle and thus statistically it is not possible to reckon on the detection of a photon in each measurement cycle.

The measurement result of the first 50 measurement cycles is used to determine the length of a waiting period of time, the duration of which is less than or equal to the transit time of light over double the distance to a region-of-interest. In the present example the waiting period of time was determined as 10 ns and the pulse duration of the emitted light pulse was correspondingly shortened by 10 ns. At the same time, as shown in sub-diagram 1), the intensity of the emitted light pulse was increased by applying a correspondingly increased transmission start signal. After the elapse of the waiting period of time of 10 ns, at the moment 10010 ns, the operation of integrating the photoelectric current was begun by applying the integrator control signal shown in sub-diagram 3), for the first integrator. At the moment in time 10020 ns the first integrator is switched off and the second integrator is activated. The measurement result of that second measurement cycle in determining distance involves a reduced measurement error in relation to that of the first measurement cycle because the intensity of the emitted light pulse was increased and, due to the presence of the waiting period of time, less photoelectric current produced by noise and by background light was involved in the measurement result.

The second measurement cycle is also repeated 50 times like the first in the illustrated example in order further to improve the measurement result in determining distance. Those 50 iterations are not shown in FIG. 3.

Figure 4:
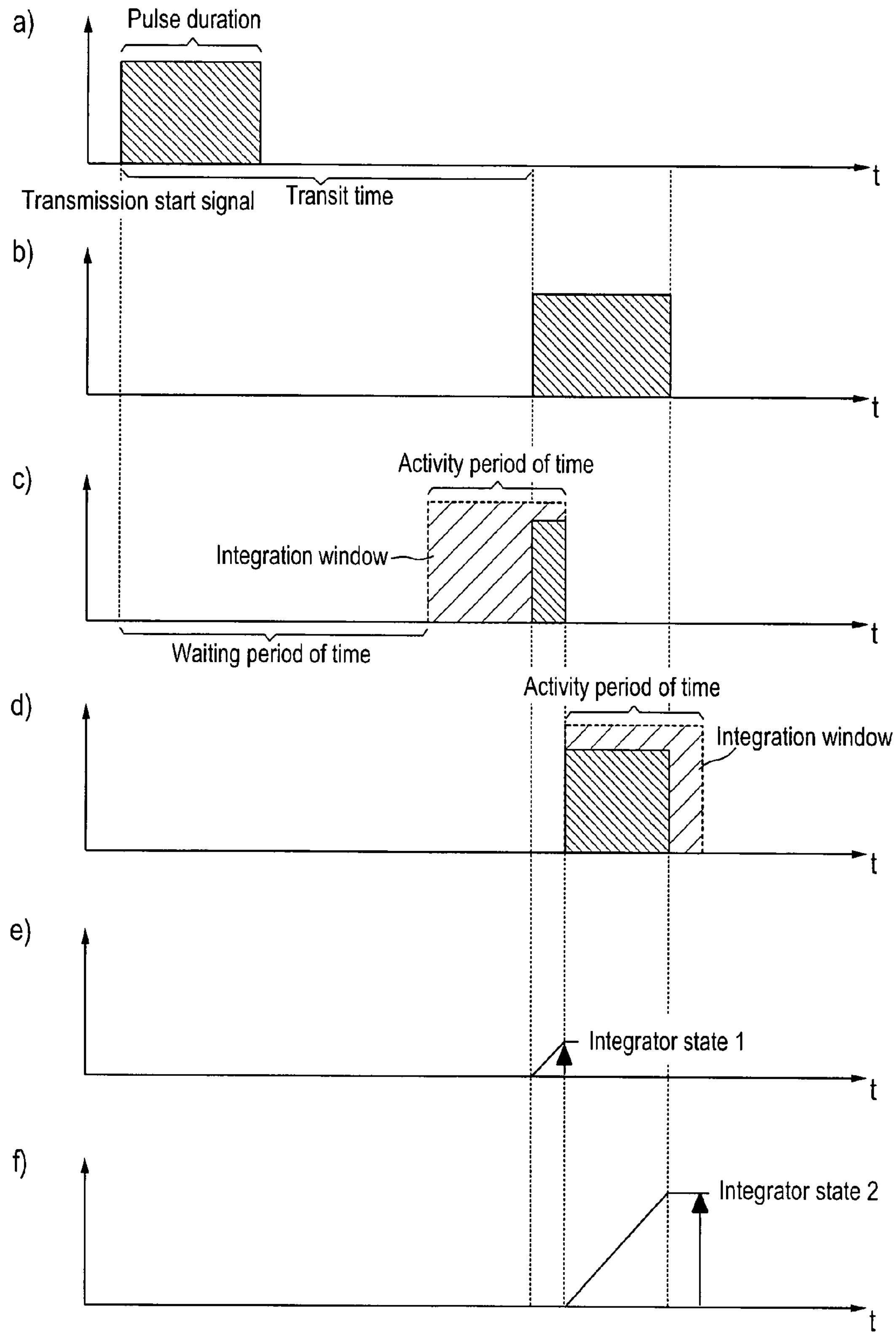
FIG. 4 shows an overview of the procedure in respect of time of another variant of the method according to the invention.

FIG. 4 shows an overview of the configuration in respect of time of another variant of the method according to the invention. The illustrated coordinate system has in six sub-coordinate systems a) through f) six different signals which are each plotted in relation to time t.

The sub-coordinate system a) plots a light pulse of a predeterminable pulse duration, which is emitted by the transmitting unit with a transmission start signal outputted to the transmitting unit by the control unit. The light pulse shown in sub-coordinate system b) is the light pulse which is emitted by the transmitting unit and which is reflected by the object after a transit time dependent on the distance of the object to be measured and received by the receiver matrix and which is of approximately the same pulse duration as the light pulse emitted by the transmitting unit.

As shown in the sub-coordinate system c), after a predeterminable waiting time which in this case is greater than zero and less than the transit time of the light pulse emitted by the transmitting unit and received by the receiver matrix, starting of the first integrator is effected by the delivery of a first integrator control signal to the first integrator by the control unit. The integrator control signal can be an integrator start signal or an integrator switch-on signal with a predeterminable switch-on time for the integrator. After the first integrator is switched on it begins integration of an input signal at the input of the first integrator. That signal (in the idealized view of the situation) is 0 as long as the reflected transmission pulse has not yet reached with its leading edge the photoelectric element 21. The switch-on duration of the first integrator is predetermined by the activity period of time and defines the integration time which in the illustrated situation is equal to the pulse duration of the light pulse. As however the activity period of time of the first integrator begins prior to reception of the light pulse reflected by the object being measured, only a first part of that light pulse reaches the photoelectric element 21 during the first integration time and leads to a corresponding input signal for the first integrator which the latter integrates, as is shown in FIGS. 4*c* and 4*e*. The integrator state of the first integrator, which occurs at the end of the first integration time, is also shown in FIG. 4*e*. After the first integration time the first integrator is switched off either by the integrator switch-on signal or by a further integrator control signal which is outputted to the first integrator by the control unit, in that case an integrator stop signal.

At the same time, similarly to the situation hereinbefore for the first integrator, the control unit outputs to the second integrator a further integrator control signal which switches on the second integrator. The second integration time of the second integrator, which is also predetermined by the activity period of time, is in this case also equal to the pulse duration.

As can be seen from FIG. 4*d* only a rear part of the reflected light pulse goes to the photoelectric element 21 within the second integration time and provides for a corresponding input signal of the second integrator. The trailing edge of the reflected light pulse reaches the photoelectric element before the second integration time ends so that the integrator state of the second integrator is subsequently not further increased (if no interference radiation occurs). The integration state of the second integrator at the end of the second integration time is shown in FIG. 4*f*. After the end of the activity period of time of the second integrator it is switched off similarly to the situation with the first integrator.

As the second integrator is switched on immediately after the first integrator is switched off the total energy content of the received light pulse is used for producing an input signal, which is actually used, for the first and second integrators respectively.

Figure 5:
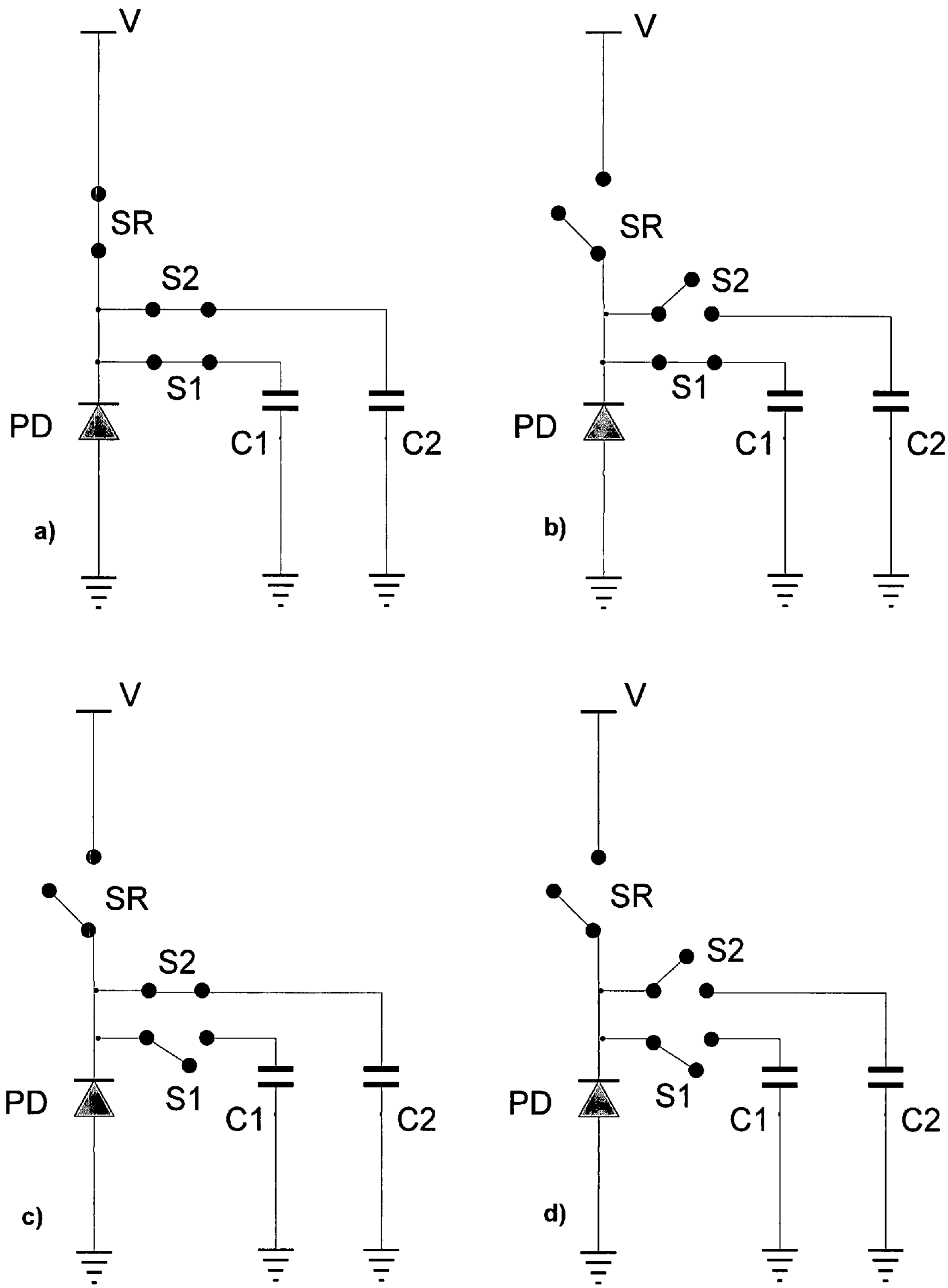
FIG. 5 shows a first circuit configuration of a photoelectric element in the form of a photoelectric diode with two integrators connected thereto.
Figure 6:
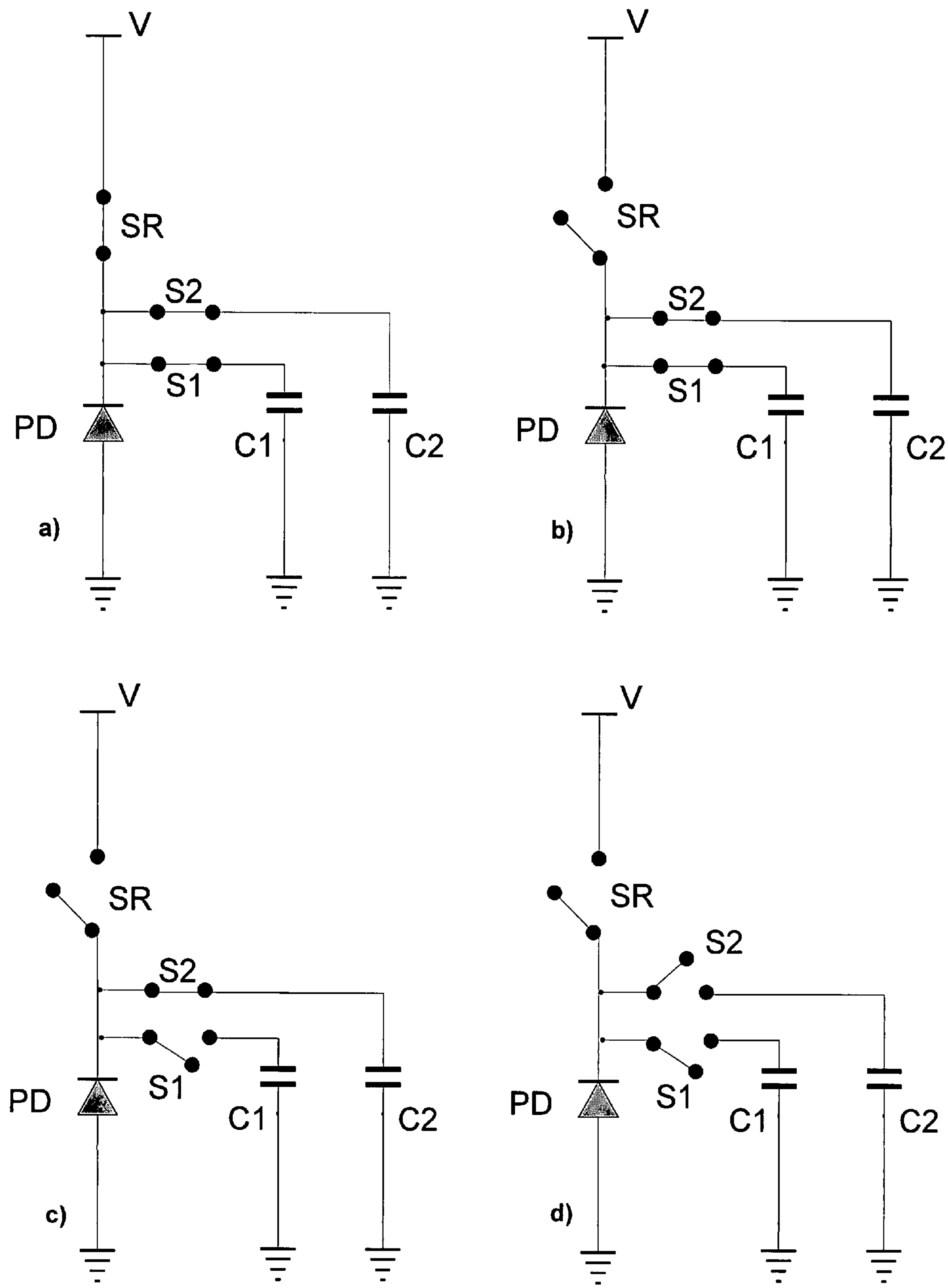
FIG. 6 shows a second circuit configuration of a photoelectric element in the form of a photoelectric diode with two integrators connected thereto.

FIGS. 5 and 6 show circuits which are each identical in terms of their structure. The 4 illustrations in each of FIGS. 5 and 6 show the sequence in which corresponding switches of the circuits are actuated. It is here that there is the difference between the embodiments of FIG. 5 and FIG. 6.

The basic elements of the circuits of FIG. 5 and FIG. 6 are a photoelectric element 21 in the form of a photoelectric diode PD and two integrators 22 and 23 which are each formed by a capacitance in the form of a respective capacitor C1 and C2. A respective connection of the two capacitors C1 and C2 each forming a respective integrator, like the anode of the photoelectric diode PD, are connected together by way of a common ground contact. The respective other connections of the two capacitors C1 and C2 are connected by way of a respective switch S1 and S2 to the cathode of the photoelectric diode PD. That therefore affords an electrical node point in the circuit, at which the cathode of the photoelectric diode PD and the two switches S1 and S2 are connected together. A third switch is arranged as a reset switch RS between that node point of the circuit and a voltage connection V for the reset voltage.

Now, the mode of operation of the circuit shown in FIGS. 5*a* and 5*d* will firstly be described hereinafter. The mode of operation of the circuit of FIGS. 6*a* through 6*d* will then be described.

Firstly—prior to the first integration time—a reset operation is effected, in which all three switches, the reset switch RS and the switches S1 and S2 for the capacitors C1 and C2, are similarly closed. In that way the two capacitors C1 and C2 are charged to a reset voltage V as a reference value. That is shown in FIGS. 5*a* and 6*a*. That means that the two variants of FIGS. 5 and 6 do not differ in terms of the reset operation.

During the first integration time a signal is to be formed which depends on the amount of light incident on the photoelectric diode PD during that integration time. In order to produce that signal firstly the reset switch RS is opened as shown in FIG. 5*b* and at the same time the switch S2 is opened by an integrator control signal so that only the first capacitor C1 can be discharged during the first integration time by way of the photoelectric diode PD as a consequence of the photoelectric current flowing through the photoelectric diode in dependence on the incident amount of light. With the opening of the two switches RS and S2, the first integration time begins, during which the first capacitor discharges as a consequence of the photoelectric current. The switch S1 is opened at the end of the first integration time so that the first capacitor C1 cannot further discharge. The amount by which the first capacitor C1 was discharged during the first integration time can be considered as an integral of the photoelectric current which has flowed through the photoelectric diode PD as a consequence of the light pulse. Simultaneously with opening of the first switch S1 the second switch S2 is closed while the reset switch S still remains opened. The second integration time begins with closure of the second switch S2 during which the second capacitor C2 can discharge by way of the photoelectric diode PD as a consequence of the photoelectric current flowing through the photoelectric diode PD. As already stated hereinbefore, that photoelectric current depends on the amount of light incident on the photoelectric diode PD during the second integration time window. In addition, at the beginning of the second integration time after closure of the second switch S2 a compensating operation occurs, which overlaps the actual photoelectric current as the second capacitor C2 and the photoelectric diode have different output voltages at the beginning of the second integration time and as a consequence of the first integration time. All that is shown in FIG. 5*c*.

At the end of the second integration time the second switch S2 is also opened again so that now all three switches, the first switch S1, the second switch S2 and the reset switch RS, are opened. The voltages which reflect the respective integrator states and which are applied at the capacitors C1 and C2 can now be further processed, as described hereinbefore, either by being directly evaluated or by those voltages being accumulated over a plurality of measurement cycles.

The embodiment of FIGS. 6*a* through 6*d* differs from the variant shown in FIGS. 5*a* through 5*d* by the way in which the capacitor voltages are formed during the first and second integration times.

It will be seen from FIG. 6*b* that, at the beginning of the first integration time, only the reset switch RS is opened by a corresponding integrator control signal. The first and second switches S1 and S2 remain closed so that now the two capacitors C1 and C2 can be discharged simultaneously by way of the photoelectric diode PD as a consequence of the photoelectric current flowing through the photoelectric diode.

At the end of the first integration time and at the beginning of the second integration time only the first switch S1 is opened while at the same time the second switch S2 remains closed and the reset switch RS also remains opened; see FIG. 6*c*. That means that the second capacitor C2 continues to be further emptied by way of the photoelectric diode PD as a consequence of the photoelectric current which is flowing through the photoelectric diode PD and which is dependent on the respective amount of light incident on the photoelectric diode PD. As therefore the photoelectric diode PD and the second capacitor C2 involve the same potential difference at the beginning of the second integration time, a compensating operation which is superposed on the integration procedure does not occur.

At the end of the second integration time the second switch S2 is also opened by a corresponding integrator control signal so that now all three switches are equally opened; see FIG. 6*d*. As already described with reference to FIG. 5*d* the voltages of the capacitors C1 and C2 can now be read out and evaluated or transferred to further capacitances in which then the respective final voltages of the capacitors C1 and C2 over a plurality of measurement cycles are accumulated.

Figure 7:
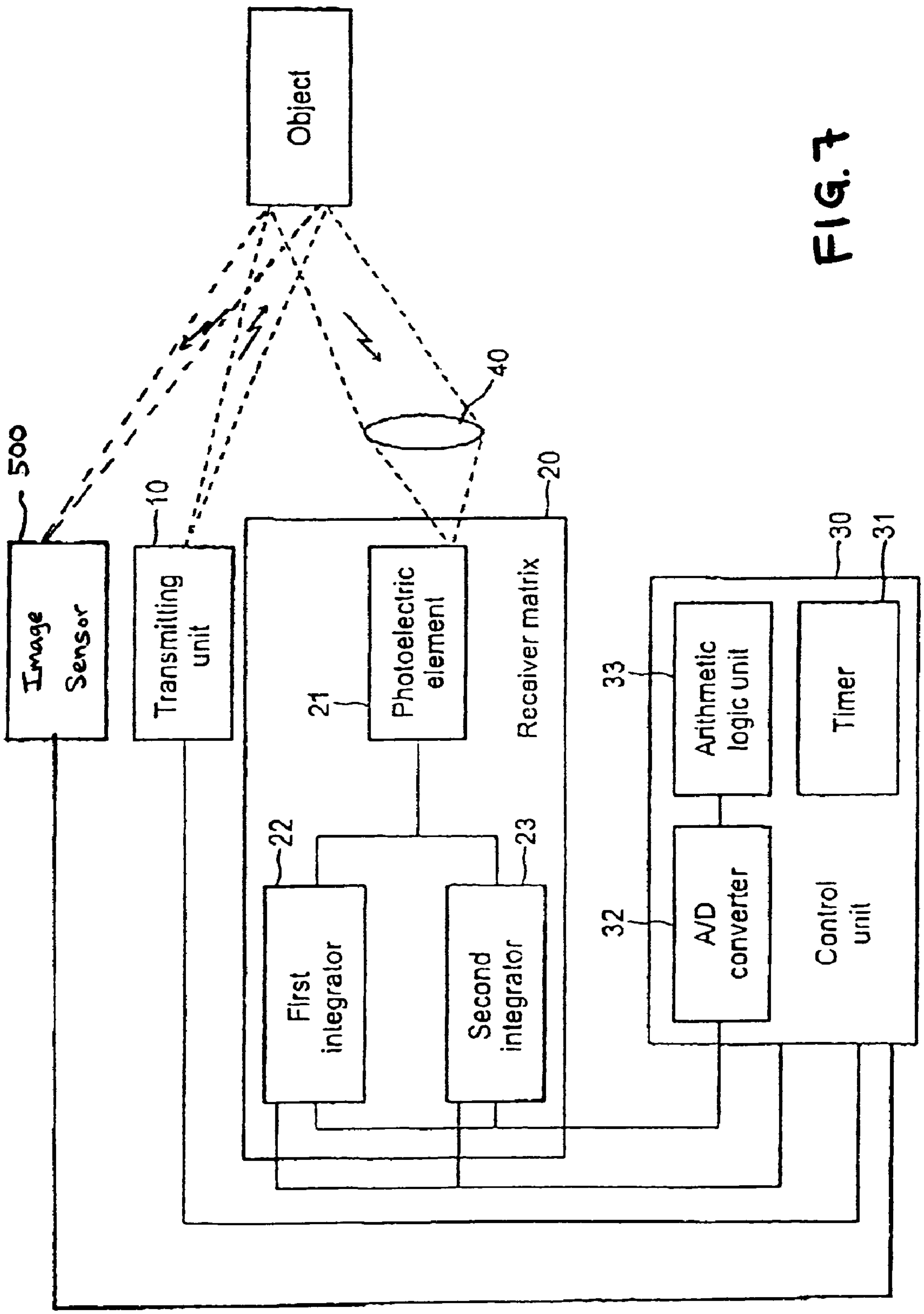
FIG. 7 shows a variant of the embodiment of the apparatus shown in FIG. 1 in the form of a block diagram.

Similar to FIG. 1, FIG. 7 shows a view of an embodiment of the apparatus according to the invention in the form of a block diagram. The embodiment of FIG. 7 differs from the embodiment of FIG. 1 in that an image sensor 500 is also provided. The image sensor 500 is coupled to control unit 30 and is adapted to detect an image region projected onto the image sensor 500 in a two-dimensional image, in particular a two-dimensional color image, and is so arranged that the image region detected by the image sensor 500 and an image region detected by the receiver matrix 20 overlap at least in a partial region, wherein the control unit 30 is adapted to link the two-dimensional image and the evaluated output signal in the partial region to afford a three-dimensional image so that the three-dimensional image has a distance value at each pixel. Further, the image sensor 500 may have a higher resolution than the receiver matrix 20.

What is claimed is:

1. Apparatus for determining distance comprising:

a transmitting unit for emitting a light pulse of a predetermined pulse duration beginning with a leading rising edge and ending with a trailing falling edge, wherein the transmitting unit has a first control input and is adapted to emit a light pulse when a transmission start signal is applied to the first control input, a receiver matrix having at least one photoelectric element, wherein the receiver matrix has a measurement output for an output signal and is adapted to output an output signal which is derived from a measurement signal produced by the photoelectric element in dependence on light incident on the photoelectric element, and a control unit which is connected to the transmitting unit and the receiver matrix and adapted to produce the transmission start signal and output it to the transmitting unit and to receive the output signal from the receiver matrix and evaluate it, characterized in that the receiver matrix has a second control input for an integrator control signal and a first and a second integrator which are connected to a single photoelectric element and the second control input, are activatable by the integrator control signal independently of each other and are respectively adapted to integrate the measurement signal over an integration time predetermined by the integrator control signal and thereby to form a respective integrator state and to output the integrator states as an output signal, wherein the control unit is adapted to:

carry out a measurement cycle with a first activity period of time by delivering two respective integrator control signals firstly to activate the first integrator for a first integration time corresponding to the first activity period of time and after a first elapse of the first activity period of time to deactivate the first integrator and activate the second integrator, execute a second measurement cycle with a second activity period of time after the execution of a first measurement cycle with a first activity period of time, and when executing the second measurement cycle the control unit is adapted to allow a waiting period of time to elapse after the delivery of the transmission start signal and to deliver the integrator control signal for starting the first integrator after the elapse of the waiting period of time, wherein the control unit is adapted to determine a distance of a region-of-interest in relation to the receiver matrix on the basis of the output signal of the receiver matrix of the first measurement cycle and to make the waiting period of time less than or equal to a transit time of light over a path corresponding to double the distance, and form a distance signal on the basis of the emission of a light pulse and evaluation of the integrator states, to be associated therewith, of the integrators.

2. Apparatus as set forth in claim 1 characterized in that the control unit has a timer configured to determine the pulse duration and the integration time of the first and second integrators.

3. Apparatus as set forth in claim 1 characterized in that the second activity period of time is shorter than the first activity period of time.

4. Apparatus as set forth in claim 3 characterized in that the transmitting unit is adapted to emit light pulses of differing pulse duration, wherein the pulse duration can be predetermined by the control unit by the transmission start signal, and the control unit is adapted to execute the first measurement cycle with a light pulse of a first pulse duration and a first intensity and the second measurement cycle with a light pulse of a second pulse duration and a second intensity, wherein the first pulse duration is greater than the second pulse duration and the first intensity is less than the second intensity.

5. Apparatus for determining distance comprising:

a transmitting unit for emitting a light pulse of a predetermined pulse duration beginning with a leading rising edge and ending with a trailing falling edge, wherein the transmitting unit has a first control input and is adapted to emit a light pulse when a transmission start signal is applied to the first control input, a receiver matrix having at least one photoelectric element, wherein the receiver matrix has a measurement output for an output signal and is adapted to output an output signal which is derived from a measurement signal produced by the photoelectric element in dependence on light incident on the photoelectric element, and a control unit which is connected to the transmitting unit and the receiver matrix and adapted to produce the transmission start signal and output it to the transmitting unit and to receive the output signal from the receiver matrix and evaluate it, characterized in that the receiver matrix has a second control input for an integrator control signal and a first and a second integrator which are connected to a single photoelectric element and the second control input, are activatable by the integrator control signal independently of each other and are respectively adapted to integrate the measurement signal over an integration time predetermined by the integrator control signal and thereby to form a respective integrator state and to output the integrator states as an output signal, wherein the control unit has a timer which is adapted to display to the control unit the elapse of a period of time predetermined by the control unit and wherein the control unit is adapted to:

carry out a measurement cycle with a first activity period of time by delivering two respective integrator control signals firstly to activate the first integrator for a first integration time corresponding to the first activity period of time and after a first elapse of the first activity period of time to deactivate the first integrator and after elapse of a predetermined period of time after deactivation of the first integrator to activate the second integrator, and form a distance signal on the basis of the emission of a light pulse and evaluation of the integrator states, to be associated therewith, of the integrators.

6. Apparatus as set forth in claim 5 characterized in that the photoelectric element is rectangular, in particular square, and is of a side length of between 100 μm and 300 μm, in particular 200 μm.

7. Apparatus as set forth in claim 5 characterized in that the receiver matrix has a plurality of photoelectric elements and a first and a second integrator for each photoelectric element, wherein the photoelectric elements are arranged in a two-dimensional array.

8. Apparatus as set forth in claim 5 characterized by an optical means which is arranged in front of the receiver matrix and is adapted to project light of the kind emitted by the transmitting unit onto the receiver matrix.

9. Apparatus as set forth in claim 5 characterized in that the transmitting unit is adapted to emit infrared light.

10. Apparatus as set forth in claim 5 characterized in that the transmitting unit is adapted to deliver light pulses of differing intensity, wherein the intensity can be predetermined by the transmission start signal applied at the first control input.

11. Apparatus as set forth in claim 5 characterized in that the control unit is adapted during the execution of a measurement cycle to activate the second integrator for a second integration time which also corresponds to the first activity period of time and to deactivate it after a second elapse of the first activity period of time, which is measured from the moment of the first elapse of the first activity period of time.

12. Apparatus as set forth in claim 5 in that the control unit is adapted to activate the transmitting unit for the duration of the first elapse of the first activity period of time and thus to trigger a light pulse having a pulse duration corresponding to the first activity period of time.

13. Apparatus as set forth in claim 5 characterized in that the control unit is adapted during the execution of a measurement cycle to simultaneously activate the transmitting unit and the first integrator by simultaneous delivery of a transmission start signal and an integrator start signal.

14. Apparatus as set forth in claim 5 characterized in that the control unit is adapted to execute a plurality of measurement cycles, wherein the first integrator and the second integrator are adapted to store their respective integrator state between the measurement cycles and thus to integrate the measurement signal over a plurality of measurement cycles, and the control unit is adapted to receive the respective output signal outputted by the first integrator and the second integrator after execution of the plurality of measurement cycles and to evaluate same.

15. Apparatus as set forth in claim 5 characterized in that the first activity period of time is between 10 and 100 ns.

16. Apparatus as set forth in claim 5 characterized in that the control unit has an A/D converter which is adapted to convert an output signal received from the receiver matrix into a digital representation and to output it as a result value.

17. Apparatus as set forth in claim 16 characterized in that the control unit has an arithmetic logic unit which is connected to the A/D converter and adapted to interlink a first result value converted by the A/D converter and outputted by the first integrator and a second result value converted by the A/D converter and outputted by the second integrator in accordance with a predetermined calculation rule and to output the calculation result.

18. Apparatus as set forth in claim 17 characterized in that the calculation rule is $$s = \frac{cT}{4}\left(1 + \frac{A_2 - A_1}{A_1 + A_2}\right),$$

wherein s is the calculation result, c is the speed of light, T is the first activity period of time, $A_1$ is the first result value converted by the A/D converter and $A_2$ is the second result value converted by the A/D converter.

19. Apparatus as set forth in claim 5 wherein the second activity period of time is equal to the first activity period of time less the waiting period of time.

20. Apparatus as set forth in claim 19 wherein the second duration is equal to the second activity period of time.

21. Apparatus as set forth in claim 5 characterized by an image sensor which is adapted to detect an image region projected onto the image sensor in a two-dimensional image, in particular a two-dimensional color image, and is so arranged that the image region detected by the image sensor and an image region detected by the receiver matrix overlap at least in a partial region, wherein the control unit is adapted to link the two-dimensional image and the evaluated output signal in the partial region to afford a three-dimensional image so that the three-dimensional image has a distance value at each pixel.

22. Apparatus as set forth in claim 21 characterized in that the image sensor has a higher resolution than the receiver matrix.

23. Apparatus as set forth in claim 5 characterized in that first and the second integrators each have a respective capacitor (C1, C2) which are to be switched by way of a respective switch (S1, S2) in parallel relationship with the photoelectric element (PD), wherein the switches (S1, S2) are to be opened and closed independently of each other by integrator control signals of the control unit.

24. Apparatus as set forth in claim 23 characterized in that the photoelectric element is a photoelectric diode (PD).

25. Apparatus as set forth in claim 23 characterized in that the first and second capacitors are to be charged to the same output voltage by way of a reset switch.

26. Apparatus as set forth in claim 5 characterized in that the control unit is adapted after the execution of a first measurement cycle with a first activity period of time to execute a second measurement cycle with a second activity period of time, the second activity period of time being shorter than the first activity period of time.

27. Apparatus as set forth in claim 26 characterized in that the control unit is adapted when executing the second measurement cycle to allow a waiting period of time to elapse after the delivery of the transmission start signal and to deliver the integrator control signal for starting the first integrator after the elapse of the waiting period of time.

28. Apparatus as set forth in claim 27 characterized in that the control unit is adapted to determine a distance of a region-of-interest in relation to the receiver matrix on the basis of the output signal of the receiver matrix of the first measurement cycle and to make the waiting period of time less than or equal to the transit time of light over a path corresponding to double the distance.

29. A method of determining spacing comprising the steps:

emitting a light pulse of a predeterminable pulse duration, integrating via a first integrator a photoelectric current of a photoelectric element during a first measurement cycle with a first activity period of time, and deactivating said first integrator after a first elapse of the first activity period of time, outputting a first output signal, integrating via a second integrator the photoelectric current of the same photoelectric element during a second measurement cycle with a second activity period of time which follows the first elapse of the first activity period of time, outputting a second output signal, and wherein when executing the second measurement cycle allowing a waiting period of time to elapse after the emitting of said light pulse and delivering an integrator control signal for starting the first integrator after the elapse of the waiting period of time, and determining a distance of a region-of-interest in relation to the photoelectric current of the photoelectric element during the first measurement cycle and making the waiting period of time less than or equal to a transit time of light over a path corresponding to double the spacing, and determining a signal transit time of the light pulse by evaluation of the first and second output signals.

30. A method of determining spacing comprising the steps:

emitting a light pulse of a predeterminable pulse duration, integrating a photoelectric current of a photoelectric element during a first elapse of a first activity period of time, outputting a first output signal, integrating the photoelectric current of the same photoelectric element during a second elapse of the first activity period of time which follows the first elapse of the first activity period of time after elapse of a predetermined period of time, wherein the photoelectric current produced by the same photoelectric element during the second elapse of the first activity period of time substantially results from the same emitted light pulse that is emitted during the first elapse of the first activity period of time, outputting a second output signal, and determining a signal transit time of the light pulse by evaluation of the first and second output signals.

31. A method as set forth in claim 30 wherein the first activity period of time is equal to the predeterminable pulse duration of the light pulse.

32. A method as set forth in claim 30 wherein, in the step of emitting the light pulse, the intensity of the light pulse can be predetermined.

33. A method as set forth in claim 30 wherein the steps of emitting the light pulse, integrating the photoelectric current during the first elapse of the first activity period of time and integration of the photoelectric current during the second elapse of the first activity period of time are effected a plurality of times prior to the steps of outputting the first output signal and outputting the second output signal.

34. A method as set forth in claim 30 characterized in that the steps of emitting the light pulse and integrating the photoelectric current are effected simultaneously during the first elapse of the first activity period of time.

35. A method as set forth in claim 30 wherein a waiting period of time is allowed to elapse between the beginning of the step of emitting the light pulse and the beginning of the step of integrating the photoelectric current during the first elapse of the first activity period of time.

36. A method as set forth in claim 34 wherein two measurement cycles are executed, wherein in the first measurement cycle the steps of emitting the light pulse and integrating the photoelectric current are effected simultaneously during the first elapse of the first activity period of time and in the second measurement cycle the waiting period of time is allowed to elapse between the beginning of the step of emitting the light pulse and the beginning of the integration step.

37. A method as set forth in claim 36 wherein the waiting period of time is determined by evaluation of the output signal of the first measurement cycle in respect of a distance in relation to a region-of-interest, wherein the waiting period of time is less than or equal to the transit time of light over a path corresponding to double the distance to the region-of-interest.

38. A method as set forth in claim 30 wherein in the first measurement cycle in the step of emitting the light pulse a light pulse of a first pulse duration and a first intensity is emitted and in the second measurement cycle in the step of emitting the light pulse a light pulse of a second pulse duration and a second intensity is emitted, wherein the first pulse duration is greater than the second pulse duration and the first intensity is lower than the second intensity.

39. A method as set forth in claim 30 wherein the first outputted output signal and the second outputted output signal are interlinked in accordance with a predetermined calculation rule, wherein the result of the predetermined calculation rule identifies a distance.

40. A method as set forth in claim 30 wherein a step of recording a two-dimensional image, in particular a color image, and a step of linking the two-dimensional image and the evaluated output signals to afford a three-dimensional image are effected, wherein the three-dimensional image has a distance value in relation to each pixel.

* * * * *